United States Patent [19]

Givati

[11] Patent Number: 4,651,849

[45] Date of Patent: Mar. 24, 1987

[54] MOTOR VEHICLE ACCESSORY PARTICULARLY USEFUL FOR PROTECTING THE VEHICLE AGAINST THEFT

[75] Inventor: Izhak Givati, Kiryat Gat, Israel

[73] Assignee: Shakbar Investments Ltd., Tel Aviv, Israel

[21] Appl. No.: 817,082

[22] Filed: Jan. 8, 1986

[30] Foreign Application Priority Data

Jan. 22, 1985 [IL] Israel ..................................... 74119
Apr. 10, 1985 [IL] Israel ..................................... 74860

[51] Int. Cl.⁴ .............................................. B60R 25/00
[52] U.S. Cl. ........................................ 180/287; 70/225
[58] Field of Search .................. 180/287; 70/225, 226, 70/14, 15, 30, 237, 259, 260

[56] References Cited

U.S. PATENT DOCUMENTS

| | | | |
|---|---|---|---|
| 1,396,067 | 11/1921 | Setkowski | 70/225 |
| 1,688,496 | 10/1928 | Holtzman | 70/221 |
| 1,799,593 | 4/1931 | Lavender | 70/260 |
| 3,537,548 | 11/1970 | Jeppesen | 70/225 |
| 3,695,071 | 10/1972 | West | 70/225 |
| 3,713,668 | 1/1973 | Flindt | 70/226 |
| 3,907,072 | 9/1975 | Shafer | 70/226 |
| 4,249,404 | 2/1981 | Kimberlin | 180/287 |
| 4,269,049 | 5/1981 | Henderson | 70/18 |
| 4,282,769 | 8/1981 | Sandrock | 180/287 |

FOREIGN PATENT DOCUMENTS 0080893 6/1983 European Pat. Off. .
2124566 2/1984 United Kingdom .

OTHER PUBLICATIONS

German Gebrauchmuster G-8117063.7, dated 10-6-1981.

Primary Examiner—Richard A. Bertsch
Attorney, Agent, or Firm—Benjamin J. Barish

[57] ABSTRACT

A motor vehicle accessory to be applied to a tire of a motor vehicle in order to interpose a resistance against rotation of the tire on the ground, and therefore particularly useful for protecting the vehicle against theft. The accessory comprises a pair of locking members pivotably mounted to each other at one end from an open, operable position to a closed, folded position. The ends of the locking members are formed with transversely-extending sections to extend transversely across the outer face of the vehicle tire such that when the accessory is applied in its open position to the vehicle tire, the sections engage the tire at three locations. The accessory further includes a locking device for locking the two locking members on the vehicle tire, comprising, a toothed ratchet bar carried by one locking member received within a ratchet housing carried by the other locking member.

20 Claims, 6 Drawing Figures

MOTOR VEHICLE ACCESSORY PARTICULARLY USEFUL FOR PROTECTING THE VEHICLE AGAINST THEFT

BACKGROUND OF THE INVENTION

The present invention relates to a motor vehicle accessory to be applied to a tire of the motor vehicle in order to interpose a resistance against rotation of the tire on the ground. The invention is therefore particularly useful as a locking device for protecting the vehicle against theft. The invention, however, may also be used in a manner similar to the well known "Denver Boot", as a locking device for immobilizing a vehicle illegally parked in a restricted area, requiring the owner to pay a fine for removal of the device. Still further uses of the accessory of the present invention include as an aid in extricating a motor vehicle from sand, mud, snow or ice, or in converting the vehicle tires to snow tires for driving under snow-covered or ice-covered roads.

SUMMARY OF THE INVENTION

According to a broad aspect of the present invention, there is provided a motor vehicle accessory to be applied to a tire of a motor vehicle in order to interpose a resistance against rotation of the tire on the ground, comprising: a pair of locking members pivotably mounted to each other at one end from an open, operable position to a closed, folded position; one end of at least one locking member and the opposite ends of both locking members being formed with transversely-extending sections to extend transversely across the outer face of the vehicle tire such that when the accessory is applied in its open, position to the vehicle tire, one transversely-extending section engages the vehicle tire at a first location thereof, and the other two engage the vehicle tire at second and third locations thereof on opposite sides of said first location; and a locking device for locking the two locking members on the vehicle tire, comprising, a toothed ratchet bar carried by one locking member received within a ratchet housing carried by the other locking member.

Such an accessory may be conveniently used by the owner for immobilizing the motor vehicle and thereby protecting it from theft. When so used, it provides a number of important advantages over other locking devices now widely used for this purpose, such as devices which lock the steering wheel against rotation. These known vehicle locking devices are generally disposed within the vehicle and can be circumvented by the use of various tools by the would-be thief after he enters the vehicle and therefore while he is out of the sight of passers-by. However, when the accessory of the present invention is used as a locking device, it has to be penetrated while the would-be thief is still outside the vehicle, where passers-by may see him, and therefore such a device is more likely to deter an attempt to steal that particular vehicle.

The accessory of the present invention can be constructed of a few simple parts and therefore can be made available to the general public at low cost, much lower than the cost of the well known "Denver Boot"; the latter device is a very massive construction suitable for use only by the municipal authorities in order to discourage parking in restricted areas. The accessory of the present invention may also be used in other applications, e.g. extricating the motor vehicle from sand, mud, snow or ice, or while driving under snow or ice conditions.

Further features and advantages of the invention will be apparent from the description below.

BRIEF DESCRIPTION OF THE DRAWINGS

The invention is herein described, by way of example only, with reference to the accompanying drawings, wherein:

FIG. 4 illustrates a cleat which may be added to the accessory when used for extricating the vehicle from sand, mud, snow or the like.

DESCRIPTION OF PREFERRED EMBODIMENTS

Figure 1:
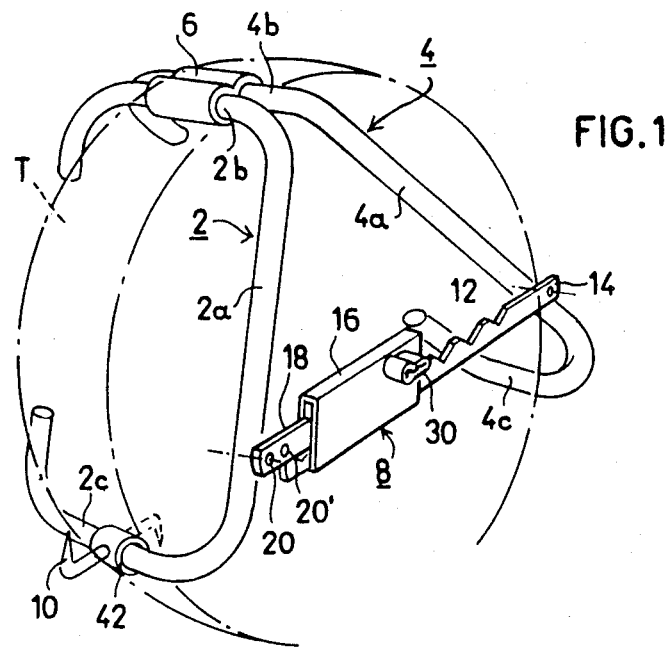
FIG. 1 is a three dimensional view illustrating one form of motor vehicle accessory constructed in accordance with the present invention, the accessory being shown in its open, operative position as applied to a tire of a motor vehicle.
Figure 2:
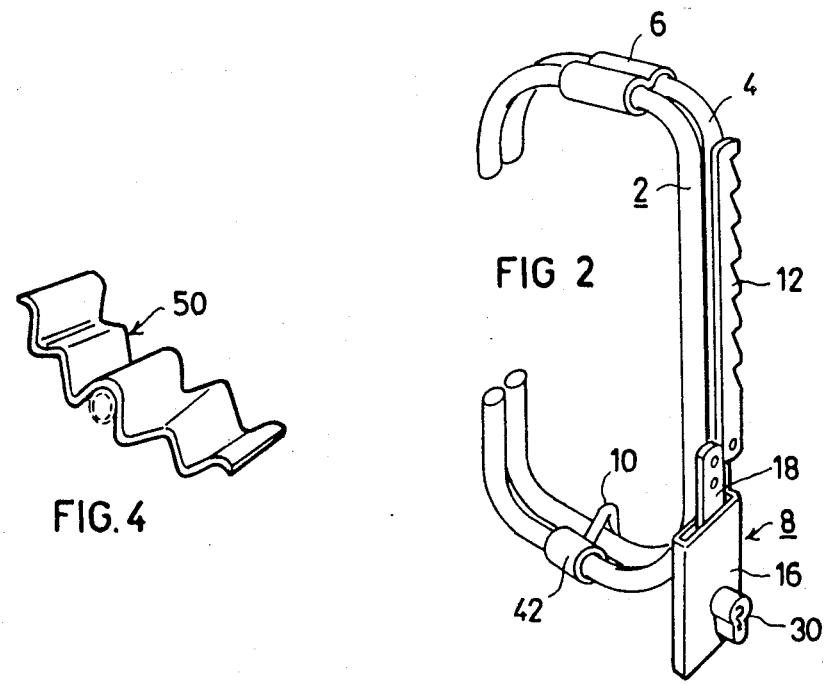
FIG. 2 illustrates the accessory of FIG. 1 in its closed, folded position; for storage or transportation.

The motor vehicle accessory illustrated in the drawings comprises a pair of locking members 2, 4, pivotably mounted to each other at one end by a sleeve 6 so that they may be pivoted either to the open, operable position illustrated in FIG. 1 for application to a vehicle tire T, or to a closed, folded position illustrated in FIG. 2 for storage or transportation. The accessory further includes a locking device, generally designated 8, which locks the two locking members 2, 4 in their operable position on the vehicle tire. The illustrated accessory may also include a pointed member, generally designated 10, movable either to an inactive position (shown in broken lines in FIG. 1) or to an active position (shown in full lines) to puncture the tire if it is rotated while the accessory is applied thereto.

More particularly, each of the locking members 2, 4, is a cylindrical bar or rod, of solid or hollow cross-section, and of substantially C-configuration. Thus, each locking member 2, 4, includes a main straight section 2a, 4a, adapted to extend across the outer face of the vehicle tire when the accessory is applied thereto, and a transversely-extending section 2b, 2c and 4b, 4c at the opposite ends of the member and adapted to extend transversely across the vehicle tire. The pivotable coupling 6 for the two locking members 2, 4 is in the form of a sleeve having a pair of openings in side-by-side relationship for receiving the transversely-extending sections 2b, 4b of the locking members.

The locking device 8 for locking the two members 2, 4 in their open, operable position (FIG. 1) includes a toothed ratchet bar 12 pivotably mounted at one end 14 to member 4, and a ratchet housing 16 secured to an arm 18 pivotably mounted at 20 to the other member 2. The pivotable connections 14 and 20 of locking device 8 to the members 4 and 2, respectively, are at the lower ends of their straight sections 2a, 4a, so as to form substantially a triangle with the straight sections when the accessory is applied to the vehicle tire.

Figure 3:
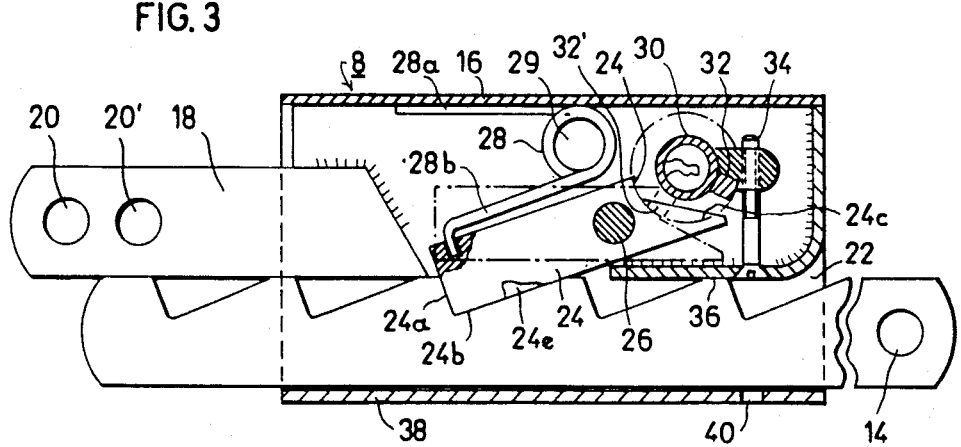
FIG. 3 is an enlarged sectional view illustrating the locking device in the accessory of FIGS. 1 and 2.

FIG. 3 more particularly illustrates the structure of locking device 8 and of the mechanism within ratchet housing 16. As shown in FIG. 3, ratchet housing 16 is formed with an opening 22 facing the toothed ratchet bar 12. Ratchet housing 16 further includes a locking pawl 24 pivotably mounted by a pin 26 and urged by a spring 28 to seat within the tooth of the ratchet bar when inserted into the ratchet housing via its opening 22. Spring 28 is a piano spring received over another pin 29 in the ratchet housing. Spring 28 includes a leg 28a at one end engageable with the inner face of the ratchet housing, and another leg 28b at the opposite end received within a socket formed adjacent the outer end of locking pawl 24.

The outer end of locking pawl 24 is formed with right angled faces 24a, 24b. The teeth on the ratchet bar 12 are configured such that the ratchet bar may be freely moved in the inserting direction of the ratchet bar, but may not be moved in the withdrawing direction unless the locking pawl 24 is moved against spring 28 to seat within the teeth of the ratchet bar.

Ratchet housing 16 is further provided with a key-operated locking mechanism for manually moving pawl 24 to release ratchet bar 12 for withdrawal from the ratchet housing. The key-operated locking mechanism comprises a lock cylinder 30 carrying a tongue engageable with face 24c of locking pawl 24 opposite to the end 24a of the locking pawl seatable within the teeth of the ratchet bar. Face 24c of the locking pawl is tapered for substantially its complete length and is formed at its upper end with a shoulder 24d for limiting the rotational movement of tongue 32 of the lock cylinder 30.

Locking pawl 24 is further formed with a notch 24e which has an end face perpendicular to wall 36 of ratchet housing 16 bordering opening 22. Thus, if a thin member should be inserted through this opening between ratchet bar 12 and housing 16, in an attempt to engage face 24b of pawl 24 and thereby to pivot it to its open position against the action of spring 28 without operating lock cylinder 30, notch 24e would receive such a member and prevent it from pivoting the pawl to its open position.

Lock cylinder 30 is secured within ratchet housing 8 by a threaded fastener 34 passing through wall 36 of the ratchet housing 16. The outer wall 38 of the ratchet housing 16 is formed with a similar opening 40 to permit a screwdriver to be introduced therethrough in order to remove fastener 34, and thereby to change the lock cylinder 30. Fastener 34 is covered by the ratchet bar 12 when inserted into ratchet housing 16, so that access is available to fastener 34 for removing and replacing lock cylinder 30 only when ratchet bar 12 is separated from the ratchet housing.

Pointed member 10 (FIG. 1) includes a sleeve 42 mounted on transversely-extending section 2c of locking member 2. Thus, the pointed member may be pivoted to the full line position illustrated in FIG. 1, wherein it is disposed externally of section 2c of the locking member and substantially centrally thereof, in position to puncture the tire T if the vehicle were driven while the accessory 2 was applied thereto in the manner illustrated in FIG. 1. To render the pointed member 10 ineffective, it may be shifted along section 2c so as to be disposed adjacent to straight section 2a, and may be pivoted to face inwardly as shown by the broken lines in FIG. 1.

The accessory illustrated in FIGS. 1-3 may be used as follows:

When not in use, the accessory would be in its closed or folded condition illustrated in FIG. 2, wherein its two locking members 2, 4 are pivoted together, its ratchet bar 12 is pivoted into alignment with section 4a of locking member 4, and ratchet housing 16 is pivoted in the opposite direction into alignment with section 2a of locking member 2. In addition, pointed member 10 on section 2c of locking member 2 would be pivoted to overlie section 4c of locking member 4. The accessory is thus folded to a compact condition convenient for storing or transportation.

When the accessory is to be used for immobilizing a vehicle, the two locking members 2, 4 are pivoted to their open, operative positions and are applied to the vehicle tire T as shown in FIG. 1. Ratchet bar 12 and ratchet housing 16 are pivoted into alignment with each other, and the ratchet bar is inserted into opening 22 of the ratchet housing until transversely-extending sections 2c and 4c of the locking bar 2, 4 firmly engage the outer face of the tire. As described earlier, the teeth of ratchet bar 12, and the configuration of locking pawl 24 within ratchet housing 16, are such that the ratchet bar may be freely inserted into the ratchet housing, but cannot be withdrawn from the ratchet housing until the locking pawl 24 is pivoted by the key-operated lock cylinder 30.

When the accessory is thus applied to the vehicle tire T, the transversely-extending sections 2b, 4b of the two locking members 2, 4, engage the outer face of the vehicle tire at a first location, and the two transversely-extending sections 2c and 4c engage the outer face of the tire at two additional locations on opposite sides of the first-mentioned location. Now, if one attempts to drive the vehicle while the accessory is thus applied to the vehicle tire, not only will the two locking members 2, 4, interpose a resistance against the rotation of the tire on the ground, but also the vehicle weight on the rotating tire will tend to draw the two locking members 2, 4, towards each other, thereby more firmly anchoring the accessory to the tire and also distorting the tire towards a triangular configuration, interposing further resistance against the rotation of the tire on the ground.

The use of the pointed member 10 is optional. Thus, if the automobile owner wishes to further insure against the possibility of theft of the vehicle, he may place the pointed member in its operative position as illustrated in full lines in FIG. 1. When so placed, the pointed member will puncture the tire if it is driven away while the accessory is applied thereto, thereby causing the tire, by the escape of air, to further distort to a generally triangular configuration. On the other hand, if the user does not wish to cause the tire to be punctured, he only needs to shift the pointed member 10 towards section 2a of locking bar 2, and to pivot it to its inwardly-directed position (as illustrated in broken lines in FIG. 1), whereupon the pointed member will be rendered ineffective.

When the locking accessory is thus applied to the vehicle tire, it substantially immobilizes the vehicle unless and until the accessory is removed. Its removal requires the insertion of the proper key into the lock cylinder 30. When this is done, manual rotation of the lock cylinder causes its tongue 32 (FIG. 3) to bear against tapered face 24c of locking pawl 24, and thereby to pivot the locking pawl about its pivot pin 26 to unseat its end 24a from the teeth of ratchet bar 12. The ratchet bar may then be simply withdrawn from ratchet housing 16, and the two locking members 2, 4 may be pivoted outwardly to remove them from the vehicle tire.

Arm 18 pivotably mounting ratchet housing 16 to locking member 2 is formed with two (or more) openings, as shown at 20 and 20' in FIG. 3. This permits a different effective length of arm 18 to be pivotably mounted to locking member 2. Thus, at the factory, arm 18 may be pivotably mounted to locking bar 2 via its outer opening 20 for larger size tires, and via its inner opening 20' for smaller size tires.

Figure 4:
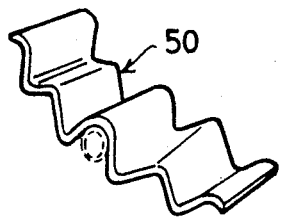

The accessory illustrated in FIGS. 1-3 can also be used for extricating a motor vehicle from sand, mud, snow or ice, by merely applying the accessory to the spinning tire with the pointed member 10, of course, removed or moved to its inoperative position. One such accessory could be applied to each of two wheels if two wheels are spinning. If the vehicle is to be used for driving over ice or snow when the accessory is used for such applications alone, lock cylinder 30 could also be omitted and replcaced by a manual member, such as a pin or lever, for releasing the locking device 8. In addition, the cleat, illustrated in FIG. 4 and therein designated 50, may be applied to the inner face of each of the transversely-extending sectons 2b-4b, 2c, 4c of the locking members 2, 4, to increase traction.

Figure 5:
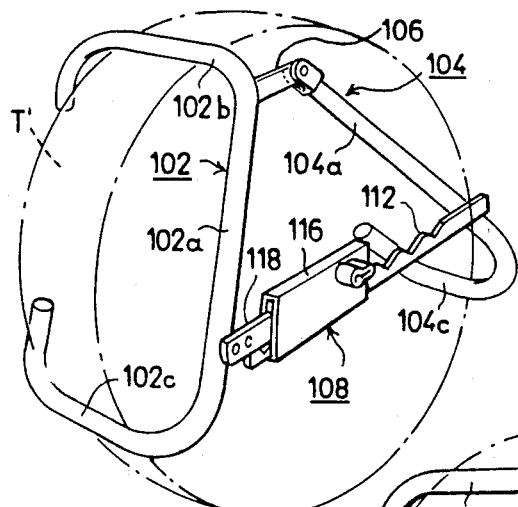
FIGS. 5 and 6 illustrate variations in the construction of the accessory of FIG. 1.

FIG. 5 illustrates a variation, wherein one of the locking members, therein designated 102, is of C-configuration as in FIG. 1, but the other locking member, therein designated 104, is of J-configuration, and is pivotably mounted at the upper end of its straight section 104a to the upper section 102a of locking member 102 by a short cross-bar 106 welded to secton 102a. Both members 102 and 104 thus include the transversely-extending sections 102c and 104c, repsectively, defining the three lines of contact with the tire T'; but only locking member 102 includes the transversely-extending section 102b on its opposite side defining the third line of contact with the tire.

Figure 6:
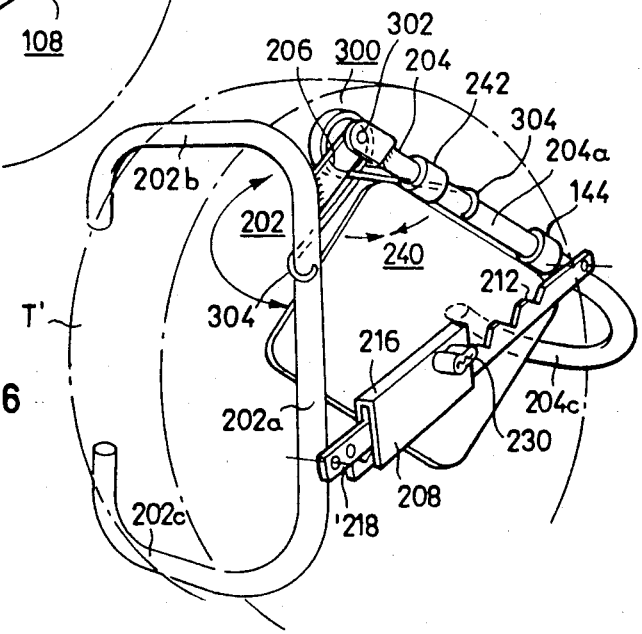

The accessory illustrated in FIG. 6 includes a plate 240 pivotably mounted to locking member 204 by a pair of rings 242, 244 fixed to plate 240 and enclosing the straight section 204a of locking member 204. Plate 240 is of square configuration and is sufficiently large so as to cover the center of the tire wheel when the accessory is applied to the vehicle tire.

The purpose of plate 240 is to cover the center of the tire wheel, particularly the hub cap and the tire mounting bolts, when the accessory is applied to the vehicle tire. in this operative position of the protector plate 240, it is retained against the center area of the vehicle tire by the straight section 202a of locking member 202, by ratchet bar 212, and by ratchet housing 216, so that it effectively prevents one from removing the hub cap, and/or the tire-mounting bolts in order to remove the tire wheel.

When the accessory is removed from the vehicle tire, locking members 202, 204 may be folded (as shown in FIG. 2), and plate 240 may be swung against them thereby providing a compact unit for storage or transportation.

The accessory of FIG. 6 further includes a coil spring 300 coaxially with the pivot axia 202 of the two locking members 202, 204. Spring 300 terminates at its opposite ends in hooks 304 engageable with the two locking members 202, 204, biasing them towards each other. Thus, if one should try to remove the locking device from the tire by deflating the tire, the two locking members 202, 204 will be urged by spring 300 towards each other to continuously grip the tire even during its deflation, and thereby prevent the removal of the device.

Many other variations, modifications and applications of the invention will be apparent.

What is claimed is:

1. A motor vehicle accessory to be applied to a tire of a motor vehicle in order to interpose a resistance against rotation of the tire on the ground, comprising:
    a pair of locking members pivotably mounted to each other at one end from an open, operable position to a closed, folded position;
    one end of at least one locking member and the opposite ends of both locking members being formed with transversely-extending sections to extend transversely across the outer face of the vehicle tire such that when the accessory is applied in its open position to the vehicle tire, one transversely-extending section engages the vehicle tire at a first location thereof, and the other two engage the vehicle tire at second and third locations thereof on opposite sides of said first location;
    and a locking device for locking the two locking members on the vehicle tire, comprising, a toothed ratchet bar carried by one locking member received within a ratchet housing carried by the other locking member.

2. The accessory according to claim 1, wherein said toothed ratchet bar is pivotably mounted at one end to said one locking member, and said ratchet housing is pivotably mounted at one end to said other locking member; said ratchet housing being formed with an opening facing the free end of said ratchet bar for receiving same, and including a locking pawl spring urged to engage a tooth of the ratchet bar for locking same against withdrawal when inserted into the ratchet housing, said locking pawl being manually-movable to disengage said tooth and thereby to permit withdrawal of said ratchet bar.

3. The accessory according to claim 2, wherein said ratchet housing includes a key-operated locking mechanism which, when unlocked permits manual movement of said locking pawl and the withdrawal of said ratchet bar.

4. The accessory according to claim 1, wherein both said locking members are bars of substantially C-configuration.

5. The accessory according to claim 1, wherein one of said pair of locking members is a bar of substantially C-configuration, and the other is a bar of substantially J-configuration pivotably mounted at the end of its straight section to said one locking member.

6. The accessory according to claim 1, wherein said locking pawl is provided with a notch engageable by the end of any member inserted into the ratchet housing in an attempt to forcefully move the pawl to its position disengaging said tooth.

7. The accessory according to claim 1, further including a plate pivotably mounted to one of the locking members from an operative position covering the center of the tire when the accessory is applied thereto, or to a folded position folded against the locking bars when the accessory is removed from the tire and the locking bars are folded into a compact form for storage or transportation.

8. The accessory according to claim 1, further including a spring continuously urging the two locking members toward each other.

9. The accessory according to claim 1, wherein one of said locking members includes a pointed member movable either to an inactive position, or to an active position to puncture the tire if rotated while the accessory is applied thereto.

10. The accessory according to claim 1, further including a cleat attachable to each transversely-extending section of each locking member to increase the traction when the accessory is used for extricating a vehicle from snow, mud, sand or the like.

11. A motor vehicle accessory to be applied to a tire of a motor vehicle in order to interpose a resistance against rotation of the tire on the ground, comprising:
a pair of locking members pivotably mounted to each other at one end from an open, operable position to a closed, folded position;
one end of at least one locking member and the opposite ends of both locking members being formed with transversely-extending sections to extend transversely across the outer face of the vehicle tire such that when the accessory is applied in its open, position to the vehicle tire, one transversely-extending section engages the vehicle tire at a first location thereof, and the other two engage the vehicle tire at second and third locations thereof on opposite sides of said first location;
and a locking device for locking the two locking members on the vehicle tire, comprising, a toothed ratchet bar carried by one locking member received within a ratchet housing carried by the other locking member;
said toothed ratchet bar being pivotably mounted at one end to said one locking member, and said ratchet housing being pivotably mounted at one end to said other locking member.

12. The accessory accrding to claim 11, wherein said ratchet housing is formed with an opening facing the free end of said ratchet bar for receiving same, and includes a locking pawl spring urged to engage a tooth of the ratchet bar for locking same against withdrawal when inserted into the ratchet housing, said locking pawl being manually-movable to disengage said tooth and thereby to permit withdrawal of said ratchet bar.

13. The accessory according to claim 12, wherein said ratchet housing includes a key-operated locking mechanism which, when unlocked permits manual movement of said locking pawl and the withdrawal of said ratchet bar.

14. The accessory according to claim 11, wherein said locking members are bars of substantially C-configuration.

15. The accessory according to claim 11, wherein one of said pair of locking members is a bar of substantially C-configuration, and the other is a bar of substantially J-configuration pivotably mounted at the end of its straight section to said one locking member.

16. The accessory according to claim 11, wherein said locking pawl is provided with a notch engageable by the end of any member inserted into the ratchet housing in an attempt to forcefully move the pawl to its position disengaging said tooth.

17. The accessory according to claim 11, further including a plate pivotably mounted to one of the locking members from an operative position covering the center of the tire when the accessory is applied thereto, or to a folded position folded against the locking bars when the accessory is removed from the tire and the locking bars are folded into a compact form for storage or transportation.

18. The accessory according to claim 11, further including a spring continuously urging the two locking members toward each other.

19. The accessory according to claim 11, wherein one of said locking members includes a pointed member movable either to an inactive position, or to an active position to puncture the tire if rotated while the accessory is applied thereto.

20. The accessory according to claim 11, further including a cleat attachable to each transversely-extending section of each locking member to increase the traction when the accessory is used for extricating a vehicle from snow, mud, sand or the like.

* * * * *